US010112171B2

(12) United States Patent
Tsapatsis et al.

(10) Patent No.: US 10,112,171 B2
(45) Date of Patent: Oct. 30, 2018

(54) REGENERABLE SYSTEM FOR THE REMOVAL OF SULFUR COMPOUNDS FROM A GAS STREAM

(71) Applicant: Regents of the University of Minnesota, Minneapolis, MN (US)

(72) Inventors: Michael Tsapatsis, Edina, MN (US); Bahman Elyassi, Minneapolis, MN (US); Yasser Al Wahedi, Abu Dhab (AE); Saleh Al Hashimi, Abu Dhab (AE)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 15/036,315

(22) PCT Filed: Nov. 10, 2014

(86) PCT No.: PCT/US2014/064832
§ 371 (c)(1),
(2) Date: May 12, 2016

(87) PCT Pub. No.: WO2015/073372
PCT Pub. Date: May 21, 2015

(65) Prior Publication Data
US 2016/0279595 A1 Sep. 29, 2016

Related U.S. Application Data

(60) Provisional application No. 61/904,912, filed on Nov. 15, 2013.

(51) Int. Cl.
*B01J 20/06* (2006.01)
*B01J 20/28* (2006.01)
(Continued)

(52) U.S. Cl.
CPC .............. *B01J 20/06* (2013.01); *B01D 53/48* (2013.01); *B01D 53/52* (2013.01); *B01D 53/82* (2013.01);
(Continued)

(58) Field of Classification Search
CPC ........................... B01J 20/103; B01J 20/0237
See application file for complete search history.

(56) References Cited

U.S. PATENT DOCUMENTS

| 4,533,529 A | 8/1985 | Lee |
| 4,725,415 A | 2/1988 | Kidd |

(Continued)

FOREIGN PATENT DOCUMENTS

| EP | 0260798 | 3/1988 |
| EP | 0324071 | 7/1989 |

OTHER PUBLICATIONS

Behl et al., "A regenerable oxide-based H2S adsorbent with nanofibrous morphology," *Nat. Nanotechnol.*, 7(12):810-815 Epub Nov. 18, 2012.

(Continued)

*Primary Examiner* — Peter F Godenschwager
(74) *Attorney, Agent, or Firm* — Fish & Richardson P.C.

(57) ABSTRACT

The disclosure relates to copper oxide-based sorbents, and processes for preparing and using them. The sorbents are preferably used to remove one or more sulfur species from gas streams. The sorbents comprise a porous silica support material impregnated with CuO nanoparticles. The nanoparticles are uniformly distributed throughout the porous silica support and sulfur compounds are adsorbed on the nanoparticles.

8 Claims, 9 Drawing Sheets

(51) Int. Cl.
| | |
|---|---|
| *B01J 20/34* | (2006.01) |
| *B01J 20/02* | (2006.01) |
| *B01J 20/10* | (2006.01) |
| *B01D 53/48* | (2006.01) |
| *B01D 53/52* | (2006.01) |
| *B01D 53/82* | (2006.01) |

(52) U.S. Cl.
CPC ....... *B01J 20/0237* (2013.01); *B01J 20/0244* (2013.01); *B01J 20/103* (2013.01); *B01J 20/28007* (2013.01); *B01J 20/28016* (2013.01); *B01J 20/28064* (2013.01); *B01J 20/28076* (2013.01); *B01J 20/28083* (2013.01); *B01J 20/3433* (2013.01); *B01J 20/3458* (2013.01); *B01J 20/3483* (2013.01); *B01D 2253/106* (2013.01); *B01D 2253/1124* (2013.01); *B01D 2253/25* (2013.01); *B01D 2253/304* (2013.01); *B01D 2257/302* (2013.01); *B01D 2257/304* (2013.01); *B01D 2257/308* (2013.01)

(56) References Cited

U.S. PATENT DOCUMENTS

| | | |
|---|---|---|
| 7,833,316 B2 | 11/2010 | Tatarchuck et al. |
| 2010/0037773 A1 | 2/2010 | Minhas et al. |
| 2016/0279595 A1 | 9/2016 | Tsapatsis |

OTHER PUBLICATIONS

Elyassi et al., "A high-performance adsorbent for hydrogen sulfide removal," *Microporous and Mesoporous Materials*, 190:152-155, May 15, 2014.

Hussain et al., "Novel mesoporous silica supported ZnO adsorbents for the desulphurization of biogas at low temperatures," *Chemical Engineering Journal*, 188:222-232, Apr. 15, 2012.

Jiang et al., "Cu—Zn—Al mixed metal oxides derived from hydroxycarbonate precursors for $H_2S$ removal at low temperature," *Applied Surface Science*, 256(10):3216-3223 Mar. 1, 2010.

Jiang et al., "Fabrication of photoluminescent ZnO/SBA-15 through directly dispersing zinc nitrate into the as-prepared mesoporous silica occluded with template," *Journal of Materials Chemistry*, 16(16):1536-1542, 2006.

Karvan et al., "Investigation of CuO/mesoporous SBA-15 sorbents for hot gas desulfurization," *Fuel Processing Technology*, 89(9):908-915, Sep. 30, 2008.

Karvan et al., "Investigation of nano-CuO/mesoporous $SiO_2$ materials as hot gas desulphurization sorbents," *Fuel Processing Technology*, 90(12):1452-1458, Dec. 31, 2009.

Kumar et al., "H2S adsorption by Ag and Cu ion exchanged faujasites," *Microporous and Mesoporous Materials.*, 146(1):127-133, Dec. 31, 2011.

Laugel et al., "Metal oxides nanoparticles on SBA-15: Efficient catalyst for methane combustion", *Catalysis Today*, 138(1):38-42, Oct. 15, 2008.

Lu et al., "Structure and Photoluminescent Properties of ZnO Encapsulated in Mesoporous Silica SBA-15 Fabricated by Two-Solvent Strategy," *Nanoscale Res Lett.*, 4(7):646-654, Mar. 21, 2009.

Montes et al., "Reactive H2S chemisorption on mesoporous silica molecular sieve-supported CuO or ZnO," *Microporous and Mesoporous Materials*, 168:111-120, Mar. 1, 2013.

Mureddu et al., "ZnO/SBA-15 composites for mid-temperature removal of $H_2S$: Synthesis, performance and regeneration studies," *Fuel*, 102:691-700, Dec. 31, 2012.

Prieto et al., "Towards stable catalysts by controlling collective properties of supported metal nanoparticles," *Nature Materials*, 12(1):34-39, Jan. 1, 2013.

Ravikovitch et al., "Characterization of nanoporous materials from adsorption and desorption isotherms," *Colloids and Surfaces A: Physicochemical and Engineering Aspects*, 187:11-21, Aug. 31, 2001.

Sayari et al., "Simple synthesis route to monodispersed SBA-15 silica rods," J Am Chem Soc., 126(44):14348-14349, Nov. 10, 2004.

Uekawa et al., "Nonstoichiometric properties of zinc oxide nanoparticles prepared by decomposition of zinc peroxide," *Physical Chemistry Chemical Physics.*, 5(5):929-934, Jan. 1, 2003.

Wang et al., "Low-temperature $H_2S$ removal from gas streams with SBA-15 supported ZnO nanoparticles," *Chemical Engineering Journal.* 142(1):48-55, Aug. 1, 2008.

Wang et al., "Rapid Functionalization of Mesoporous Materials: Directly Dispersing Metal Oxides into As-Prepared SBA-15 Occluded with Template," *Advanced Materials*, 17(3):323-327, Feb. 10, 2005.

Yang et al., "Novel-doped zinc oxide sorbents for low temperature regenerable desulfurization applications," *AIChE Journal*, 56(11):2898-2904, Nov. 1, 2010.

Zhang et al., "Highly stable and regenerable Mn-based/SBA-15 sorbents for desulfurization of hot coal gas," *Journal of hazardous materials*, 233:219-227, Sep. 30, 2012.

Zhao et al., "Triblock copolymer syntheses of mesoporous silica with periodic 50 to 300 angstrom pores," *Science*, 279(5350):548-552, Jan. 23, 1998.

Invitation to Pay Additional Fees for PCT/US2014/064832, dated Mar. 16, 2015, 7 pages.

International Search Report and Written Opinion for PCT/US2014/064832, dated May 28, 2015, 22 pages.

International Preliminary Report on Patentability for PCT/US2014/064832, dated May 17, 2016, 17 pages.

REGENERABLE SYSTEM FOR THE REMOVAL OF SULFUR COMPOUNDS FROM A GAS STREAM

CROSS-REFERENCE TO RELATED APPLICATIONS

This application is a National Stage application under 35 U.S.C. § 371 of International Application No. PCT/US2014/064832, filed Nov. 10, 2014, which claims the benefit of U.S. Provisional Application No. 61/904,912, filed Nov. 15, 2013. The disclosures of the prior applications are incorporated by reference in their entirety.

FIELD OF INVENTION

The invention relates to sorbent materials and to processes for preparing and using the sorbents. More specifically, the invention relates to highly regenerable sorbents, and to processes for removing sulfur compounds, particularly $H_2S$, from gas streams.

BACKGROUND OF THE INVENTION

Many industrial gases contain $H_2S$ and other sulfur compounds. Examples include, but are not limited to, fuel gases, Claus plant tail gases, and hydrocarbon feeds for refining and other processes. The removal of sulfur compounds from gas streams is an important part of industrial processes including those used in petroleum refining operations. Sulfur is both an environmental hazard when it is a contaminant in fuel for combustion and a poison for several catalytic materials when used in electrochemical systems such as fuel cells. Environmental regulations have been implemented to limit sulfur compound emissions and require higher levels of sulfur capture from the Claus process tail gas. Sulfur removal technologies with a smaller footprint are also highly desirable for space-limited facilities.

Currently, there are number of commercially available technologies in place for sulfur compound removal from the tail gas of the Claus process. However, the large footprint is a constraint for implementation of such technologies in space limited facilities such as offshore oil and gas processing plants or for retrofitting in refineries. High energy consumption and high maintenance costs associated with these technologies is another challenge that has not been sufficiently addressed. Commercially available sulfur removal technologies such as Beavon-MDEA, SCOT, and ARCO, all rely on energy intensive amine scrubbing and regeneration processes. In addition, the water removal steps in these processes impose high capital and operating costs.

Clearly, better sorbent compositions and methods for removing sulfur compounds are desirable.

SUMMARY OF THE INVENTION

The present invention provides sorbent compositions capable of removing sulfur compounds from a gas stream. The sorbent compositions are highly regenerable, and can readily be produced with the necessary sulfur capacity (meeting current environmental regulations), stability, and mechanical strength properties, allowing their use across a wide temperature range including relatively low temperatures and relatively high temperatures. The sorbent compositions lower capital and operating costs associated with sulfur removal and are in a suitable physical form and size for a small footprint and low maintenance process.

In one embodiment, the present invention provides a sulfidized sorbent composition comprising a porous silica support material impregnated with CuO nanoparticles, wherein the nanoparticles are essentially uniformly distributed throughout the porous silica support and sulfur compounds are adsorbed on the nanoparticles.

The silica support material can have a median pore diameter of about 5 to about 50 nm, or about 5 to about 15 nm, or about 7 to about 8 nm, or about 8 nm. The nanoparticles can have an average diameter of about 3 to about 6 nm, or less than about 6 nm, or about 5 nm.

In some embodiments, the CuO nanoparticles can further comprise Zn. The Cu/Zn molar ratio can be in the range of about 20:1 to about 1:1.

The porous silica support can have a pore volume in the range of about 0.3 to about 3.0 ml/g. The average interparticle distance between the nanoparticles can be at the theoretical maximum distance. The silica support material can also have a surface area of about 100 to about 1000 $m^2/g$, or about 750 $m^2/g$. In some embodiments, the silica support material can comprise SBA silica, MCM silica or silica gel.

The sulfur compounds can comprise $H_2S$.

Another embodiment of the present invention provides a method of preparing a sulfidized sorbent composition comprising a porous silica support material impregnated with Cu—ZnO nanoparticles, wherein the nanoparticles are essentially uniformly distributed throughout the porous silica support and sulfur compounds are adsorbed on the nanoparticles, the method comprising:
 impregnating the silica support material with an aqueous solution of zinc salt and copper salt having a molar ratio of Cu:Zn of about 2:1;
 drying the impregnated support material;
 calcinating the impregnated support material; and
 passing a gaseous stream of sulfur compounds through the impregnated support material.

The zinc salt can include zinc nitrate, zinc acetate, or a mixture thereof; and the copper salt can include copper nitrate, copper acetate, and a mixture thereof.

The step of impregnating can be performed by incipient wetness impregnating. The step of drying can be performed by vacuum drying. The vacuum drying can be performed at room temperature. The calcinating can be performed by heating the dried particles to a temperature range of about 200-600° C., or about 500° C. The calcinating can be performed in an inert gas.

In another embodiment of the present invention, a method of removing sulfur compounds adsorbed to the sulfidized sorbent composition is provided, comprising heating the sulfidized sorbent composition to a temperature between about 100-700° C. and passing an oxidizing agent over the sorbent composition.

The sulfidized sorbent composition can be heated to a temperature between about 400-550° C. The oxidizing agent can include air, pure oxygen, diluted oxygen, ozone, and hydrogen peroxide, or a combination thereof. When the oxidizing agent is diluted oxygen, the diluted oxygen can be 1-5 mol % oxygen in an inert carrier gas.

The method can further include the step of passing a reducing agent over the sorbent composition after the oxidation step. The reducing agent can include hydrogen, methane, and carbon monoxide gas, or a mixture thereof. When the reducing agent is hydrogen gas, the hydrogen gas can be 1-10 mol % hydrogen in an inert carrier gas.

The method can further include a step of passing an oxidizing agent over the sorbent composition after the reduction step. The oxidation-reduction-oxidation cycle can be repeated in tandem at least two times, or about three, four, five or greater than five times. The adsorbent can be flushed with an inert gas between each oxidation-reduction-oxidation cycle. The inert gas can be nitrogen gas.

In another embodiment of the present invention, a method for removing sulfur compounds from a gas stream is provided, the method comprising passing the gas stream through an effective amount of a sorbent composition for an effective amount of time to produce a sulfidized sorbent composition and to reduce sulfur compounds in the gas stream to a level of less than about 1 ppm, the sorbent composition comprising a porous silica support material impregnated with CuO nanoparticles, wherein the nanoparticles are essentially uniformly distributed throughout the porous silica support.

The gas steam can be heated to a temperature of less than about 400° C. before being passed through the sorbent composition. The gas stream can be heated at a temperature range of about 150 to about 250° C. The sulfur compounds in the gas stream can include $H_2S$, COS, $SO_2$, $CS_2$, and $S_2$. The gas stream can be treated with a hydrogenating agent before being passed through the sorbent composition. The hydrogenation agent can be hydrogen gas. The sulfur compounds in the gas stream can be primarily $H_2S$. The $H_2S$ concentration in the gas stream can be lower than 1%.

In some embodiments, the nanoparticles further include Zn. The Cu/Zn molar ratio can be in the range of about 20:1 to about 1:1. In some embodiments, the Cu—ZnO nanoparticles further comprise aluminum oxides. The Cu/Zn molar ratio is in the range of about 20:1 to about 1:1 and the minimum Cu/Al molar ratio is 10.

The method can further include a step of removing the sulfur compounds adsorbed to the sulfidized sorbent composition by heating the sulfidized sorbent composition to a temperature between about 100-700° C. and passing an oxidizing agent over the sorbent composition.
The sulfidized sorbent composition can be heated to a temperature between about 400-550° C.

The sorbent compositions are employed in filtering systems in preferred embodiments. The filtering system may be contained in a cartridge or in a gas stream filter assembly.

DETAILED DESCRIPTION

Figure 1:
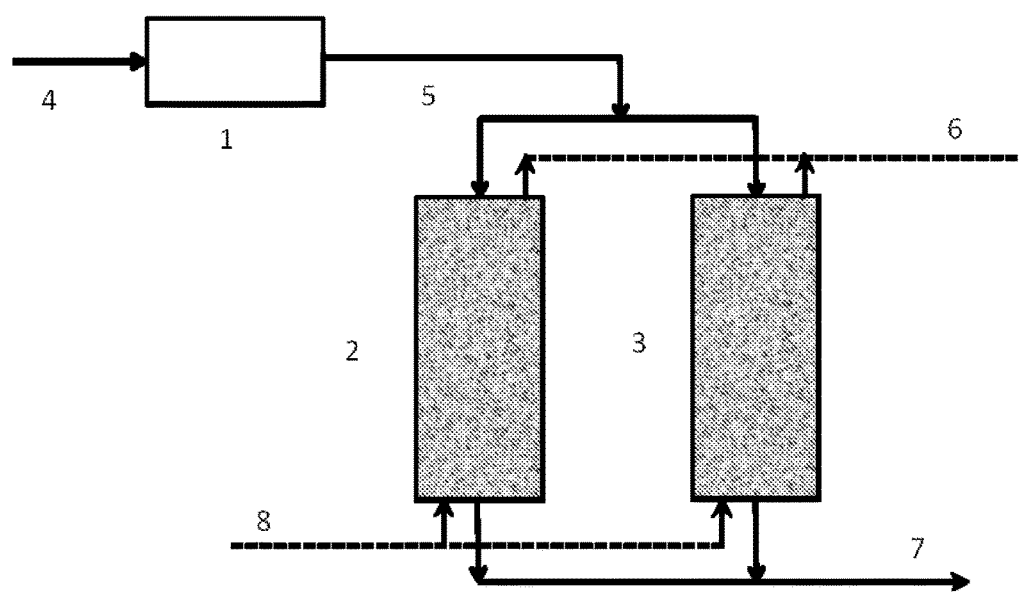
FIG. 1 is a schematic representation of a desulfurization process of the invention.

In the following detailed description, preferred embodiments of the invention are described to enable practice of the invention. Although specific terms are used to describe and illustrate the preferred embodiments, such terms are not intended as limitations on practice of the invention. Moreover, although the invention is described with reference to the preferred embodiments, numerous variations and modifications of the invention will be apparent to those of skill in the art upon consideration of the foregoing, together with the following detailed description. The parameters set forth herein are not defined by any one analytical technique. As is readily understood by those of ordinary skill, parameters may vary depending on instruments used to define certain parameters.

Unless otherwise specified, the terms "a," "an," and "the" mean one or more.

As used herein, "about," "approximately," and "substantially" will be understood by persons of ordinary skill in the art and will vary to some extent on the context in which they are used. If there are uses of the term which are not clear to persons of ordinary skill in the art given the context, "about" or "approximately" will mean up to plus or minus 10% of the particular term and "substantially" will mean more than plus or minus 50% of the particular term.

As indicated previously, the sorbent compositions of the invention can include a porous support material. The disclosed supports may include porous silicon dioxide materials (mesoporous silica-pore size range 2-50 nm) with ordered or disordered pore structure (e.g. SBA-15, SBA-16, MCM-41, MCM-48, KIT-6, FDU-12, and silica gel). As used herein, "silicon dioxide" refers to "silica" having the formula $SiO_2$. Silicon dioxide may form a porous support, such as porous particles, which may be impregnated with sorbent material as disclosed herein. In some embodiments, the silica support material can have a median pore diameter of about 5 to about 50 nm, about 5 to about 15 nm, about 7 to about 8 nm, or about 8 nm. Median pore diameter can be measured using methods known to those of ordinary skill in the art, for example, by standard nitrogen or argon adsorption analysis.

In some embodiments, the porous silica support has a pore volume in the range of about 0.3 to about 3.0 ml/g. In some embodiments, the silica support has a surface area of about 100 to about 1000 $m^2/g$, or about 750 $m^2/g$. Specific surface area can be calculated using conventional methods, including the Brunauer-Emmett-Teller (BET) theory.

The sorbent compositions may be impregnated with copper material. "Copper material" may include copper metal, copper oxides, and copper salts (e.g., copper nitrate and copper acetate). After the disclosed sorbent compositions have been calcined, preferably the compositions comprise copper metal or copper oxide. The sorbent compositions may also be impregnated with zinc material. "Zinc material" may include zinc metal, zinc oxides, and zinc salts (e.g., zinc nitrate and zinc acetate). After the disclosed sorbent compositions have been calcined, preferably the compositions comprise zinc metal or zinc oxide.

As used herein, "impregnated" refers to the introduction of a solution to a porous support material. In contrast to the term "coating" the term "impregnated" or "impregnating" means that the solution has permeated the support material or that the support material has become infused with the solution. "Coating" on the other hand only indicates that a layer of the solution has been deposited on the outer surface of the support material.

In some embodiments, the silica support is impregnated with CuO nanoparticles. In some embodiments, the nanoparticles have an average diameter of about 1 to about 8 nm or about 3 to about 6 nm or about 6 nm or about 5 nm.

Nanoparticle diameter can be measured using analytical methods known to those of ordinary skill in the art, for example, by transmission electron microscopy (TEM).

In some embodiments, the silica support is impregnated with Cu—ZnO nanoparticles. In some embodiments, the Cu/Zn molar ratio is in the range of about 20:1 to about 1:1. The sorbent can also be unsupported copper-zinc-aluminum oxides. Copper/zinc molar ratio is between 20:1 to 1:1 with a minimum Cu/Al ratio of 10.

The nanoparticles are essentially uniformly distributed throughout the porous silica support. As used herein the term "essentially uniformly distributed" means that the nanoparticles are evenly distributed throughout the entire pore system. In some embodiments, the nanoparticles are spaced at equally sized and maximally spaced distances. Without being bound by any theory of the invention, it is believed that the uniform distribution of the nanoparticles on the support contribute to the high stability achieved in the sorbent compositions of the invention.

In some embodiments, the sulfur compounds are adsorbed on the nanoparticles. As used herein, sulfur compounds may include, sulfur, hydrogen sulfide ($H_2S$), carbonyl sulfide (COS) and other sulfur compounds such as $SO_2$, $CS_2$, and $S_2$. Organosulfur compounds of the invention include compounds such as mercaptans or those thiophenic compounds found in cracked gasolines, which include, among others, thophene, benzothiophene, alkyl thophenes, alkyl benzothiophenes, and alkyldibenzothiophenes.

The sorbents of the invention have a high sulfur capacity. One method of expressing sulfur capacity is miligrams sulfur per gram of sorbent (mgS/g). In some embodiments, the sorbents provide a sulfur removal capacity in the range of about 60 to about 300 mgS/g.

In some embodiments, the sorbent compositions may be prepared by the following steps:
impregnating the silica support material with an aqueous solution of a metal salt;
drying the impregnated support material;
calcinating the impregnated support material.

In some embodiments, the silica support material is impregnated with an aqueous solution of zinc salt and copper salt having a molar ratio of Cu:Zn of about 2:1. The zinc salt can include zinc nitrate, zinc acetate, and a mixture thereof; and the copper salt can include copper nitrate, copper acetate, and a mixture thereof.

The sorbent composition can be converted to a sulfidized sorbent composition by passing a gaseous stream of sulfur compounds through the impregnated support material. The step of impregnating can be performed by incipient wetness impregnating.

The step of drying can be performed by vacuum drying. The vacuum drying can be performed at room temperature.

The calcinating can be performed by heating the dried particles to a temperature range of about 200-600° C., or 500° C. The calcinating can be performed in an inert gas.

The sorbent compositions may be utilized in methods for treating gaseous streams, liquid streams or both. In some embodiments, the sorbent composition is utilized to treat a hydrocarbon stream (e.g., a fuel stream). In a preferred embodiment, the sorbent compositions are utilized for treating gaseous streams containing sulfur compounds in Claus process tail gas or remote small natural gas processing units, syngas ($H_2$/CO) clean-up, and potential automobile exhausts.

In some embodiments, sulfur compounds are removed from a gas stream, by passing the gas stream through an effective amount of a sorbent composition for an effective amount of time to produce a sulfidized sorbent composition and to reduce sulfur compounds in the gas stream to a level of less than about 1 ppm (or about 1 to 3 ppm, or about 1 to 5 ppm).

The gas steam is heated to a temperature of less than about 400° C. (or about 150 to 250° C.) before being passed through the sorbent composition.

In some embodiments, the gas stream (e.g., Claus tail gas) is treated with a hydrogenating agent before being passed through the sorbent composition. This ensures that a significant portion of the gas is converted to $H_2S$. Typically, reducing gases present in the tail gas (e.g. $H_2$, CO, $H_2O$) are sufficient to convert all of the sulfur compounds to hydrogen sulfide via hydrogenation/hydrolysis reactions. In some embodiments, the hydrogenation agent is hydrogen gas. In some embodiments, the sulfur compounds in the gas stream are primarily $H_2S$. In some embodiments, the $H_2S$ concentration in the gas stream is lower than 1%.

The sorbent compositions are highly regenerable. As used herein, "regnerability" relates to the ability of the same sorbent to be used for multiple cycles of adsorption after stripping the adsorbed species (e.g., $H_2S$) and then to be used for subsequent cycles of adsorption. In some embodiments, the sorbent compositions do not exhibit substantially reduced sulfur capacity after regeneration in comparison to a sorbent composition that has not been regenerated. In some embodiments, the regenerated sorbent has a sulfur capacity that is at least about 60% of that of the sorbent composition that has not been previously used, or preferably about 70%, or 80%, or 90% or 95% of the sorbent composition that has not been previously used.

In some embodiments, the sorbent composition is regenerated (i.e., the sulfur compounds adsorbed to the sorbent composition are removed) by heating the sulfidized sorbent composition to a temperature between about 100-700° C. (or about 400-550° C.) and passing an oxidizing agent over the sorbent composition. The oxidizing agent can include air, pure oxygen, diluted oxygen, ozone, and hydrogen peroxide, or a combination thereof. In some embodiments, the oxidizing agent is diluted oxygen. In some embodiments, the diluted oxygen is 1-5 mol % oxygen in an inert carrier gas.

The regeneration step can involve several oxidation-reduction cycles. For example, in some embodiments, a reducing agent is passed over the sorbent composition after the oxidation step. In some embodiments, the reducing agent includes hydrogen, methane, and carbon monoxide gas, or a mixture thereof. The hydrogen gas can contain 1-10 mol % hydrogen in an inert carrier gas. In some embodiments, an additional step of passing an oxidizing agent over the sorbent composition after the reduction step is included. The oxidation-reduction-oxidation cycle can repeated in tandem at least 2 times (or 2-10 times in tandem). In some embodiments, the adsorbent is flushed with an inert gas between each oxidation-reduction-oxidation cycle. In some embodiments, the inert gas is nitrogen gas. According to another embodiment, the regeneration procedure can be sequentially performed by exposing the bed to oxidizing/reducing/oxidizing gas mixtures with flushing the bed with inert gas or steam in between. In one example, oxidizing gas and reducing gas can be 1-10 mol % hydrogen and 1-5 mol % $O_2$ in balance inert gases, respectively. In some embodiments, during the oxidation step converting copper sulfide to copper oxide, at least some copper sulfate is formed. Sulfates can react with $H_2S$ present in the gas phase and contaminate the stream with $SO_2$ during adsorption cycle. In order to eliminate this negative effect, sulfates can be reduced using reducing gases after oxidation. In the final oxidation step, the metal copper can be converted to its oxide form which has a higher activity for sulfur removal.

A schematic showing a desulfurization process of the invention is shown in FIG. 1. Ancillary equipment (e.g., compressors, valves, heaters) are not shown in the respective process flow diagram but are covered within the scope of the present invention. As shown in FIG. 1, a Claus tail gas 4 is passed through a catalytic hydro-treating reactor 1 and effluent containing hydrogen sulfide 5 is passed through the online adsorption bed 2. The resulting effluent 7 contains sub-ppm levels of hydrogen sulfide. For a continuous operation after hydrogen sulfide breakthrough (defined according to the regulations in place) in bed 1, hydro-treated flow 4 is diverted to bed 2. For regenerating bed 1, an oxidizing stream 8 comprising an oxygen-containing gas in the temperature range 100-700° C., preferably 400-550° C., is passed through the sulfided bed until complete regeneration (or any acceptable level) is achieved. Applying such low temperatures for regeneration is advantageous and permits construction of the sulfur removal unit with stainless steel, thereby lowering the capital cost of the unit. The effluent 6, containing sulfur dioxide, is returned to the Claus plant for sulfur capture.

The method may be performed using a cyclic operation in a dual bed configuration with one active bed online until the breakthrough point is reached. The sorbent can then be regenerated in an oxidizing gas at temperatures up to 550° C. The sulfur dioxide-rich effluent can be returned to the Claus plant during the regeneration step. The hyro-treated stream can be directed to the second bed. In another embodiment, the method can include two beds filled with sorbents of the invention working in cyclic fashion using operational procedures apparent to the skilled person.

The following examples illustrate preparation and use of currently preferred sorbents according to the present invention.

EXAMPLES

Example 1

Synthesis and $H_2S$ Capacity of Cu—ZnO—SBA-15 Adsorbent Material

In this example, an adsorbent material composed of copper-zinc oxides on mesoporous silica (SBA-15) (Cu—ZnO—SBA-15) was prepared. Cu—ZnO—SBA 15 was prepared by incipient wetness impregnation of aqueous solution $Cu(NO_3)_2 \cdot 3H_2O$ and $Zn(NO_3)_2 \cdot 6H_2O$ (molar ratio Cu:Zn=2:1). SBA-15 was synthesized according to the procedure developed by Sayari et al. 1.0 mL of the above solution was added to 1 g SBA-15 in 0.2 mL batches. After impregnation, powders were vacuum dried at room temperature for 24 h and then calcined at 500° C. for 4 h under a nitrogen flow of 50 mL/min.

Figure 2:
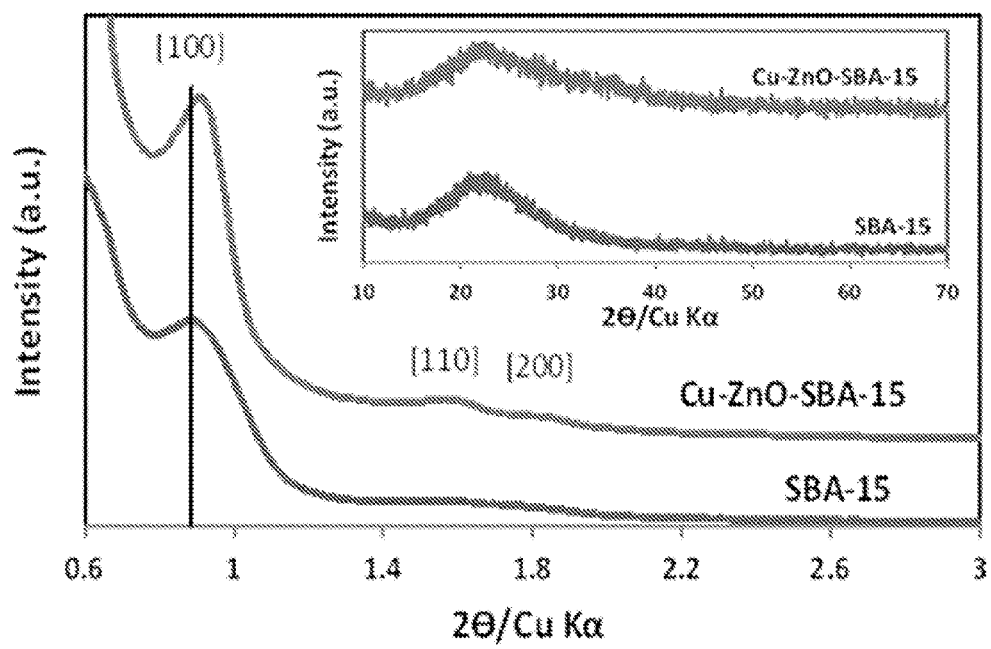
FIG. 2 depicts the results of a low angle XRD experiment showing patterns of SBA-15 and copper-zinc impregnated SBA-15. The inset in the figure shows wide angle patterns.
Figure 3:
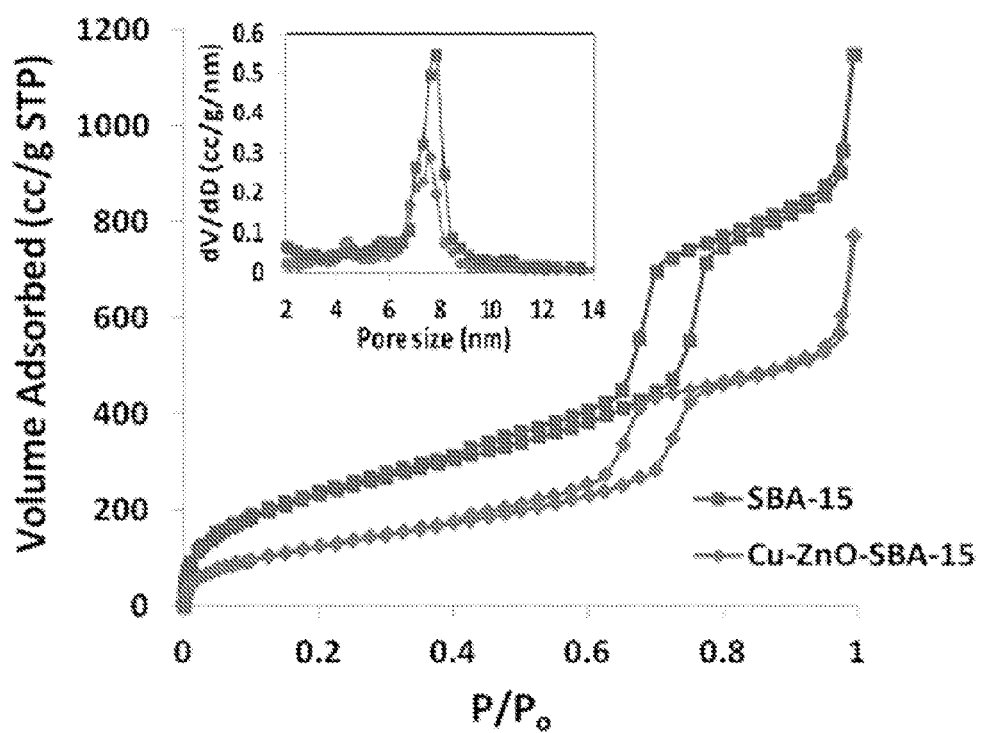
FIG. 3 shows argon adsorption-desorption isotherms for SBA-15 and Cu—ZnO—SBA-15 measured at 87 K. Pore size distribution (inset) was obtained using the NLDFT equation (silica, cylindrical pores).
Figure 4:
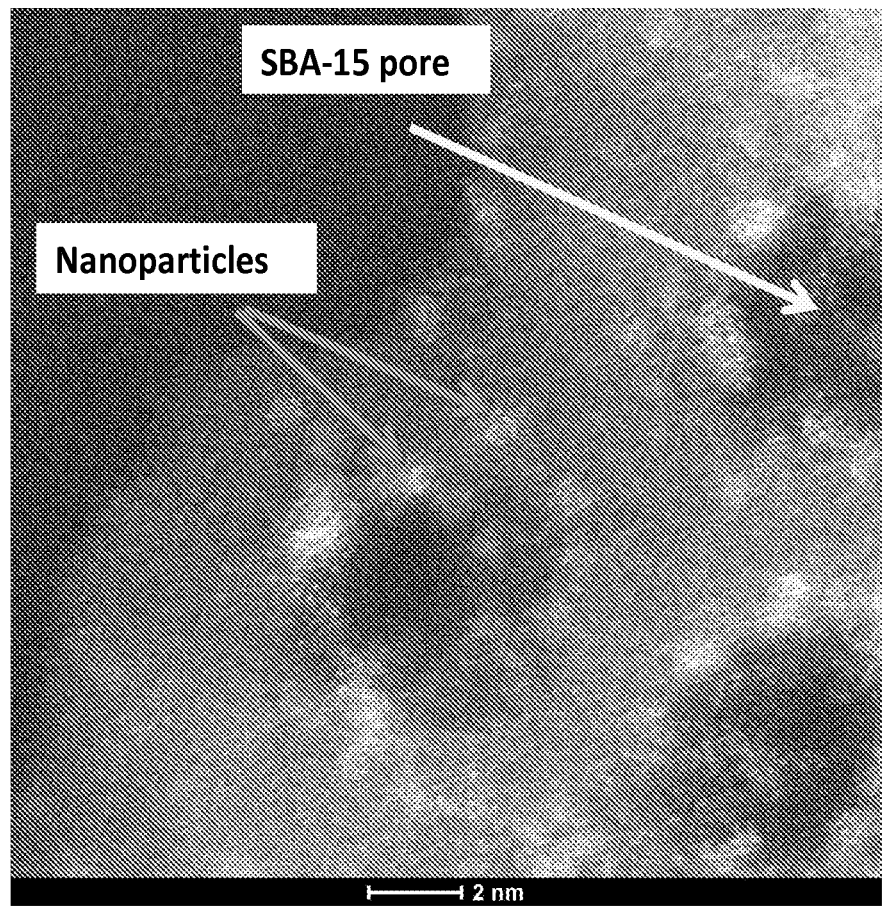
FIG. 4 shows an HAADF STEM image of sulfidized Cu—ZnO—SBA-15.

As depicted in FIG. 2, XRD patterns of SBA-15 (calcined at 550° C. for 5 h) and Cu—ZNO—ZnO—-SBA-15 (molar ratio Cu:Zn:Si=2:1:12.5) confirmed formation of mesoporous silica and its structural stability after incorporation of copper and zinc oxides. After incorporation of oxide nanoparticles, characteristic reflections shifted slightly (0.2 nm) to higher angles indicating framework contraction. No peak associated with copper or zinc oxides was detected in the diffraction patterns of Cu—ZnO—SBA-15, suggesting a high dispersion of incorporated nanoparticles on the support. Argon adsorption isotherms (FIG. 3) follow IV type with H1 hysteresis; consistent with the mesostructure of SBA-15 with one-dimensional cylindrical channels. The cumulative pore volume obtained using NLDFT model on isotherms indicated that the cumulative pore volume decreased from 1.34 cc/g to 0.77 cc/g which can be attributed to the presence of nanoparticles in the pores. Embedding nanoparticles in SBA-15 resulted in a reduction in the median pore size from 7.9 nm to 7.6 nm. STEM-HAADF imaging of Cu—ZnO—SBA-15 after sulfidation revealed a very uniform distribution of copper-zinc sulfided nanoparticles (~5 nm) in SBA-15 (FIG. 4).

Figure 5:
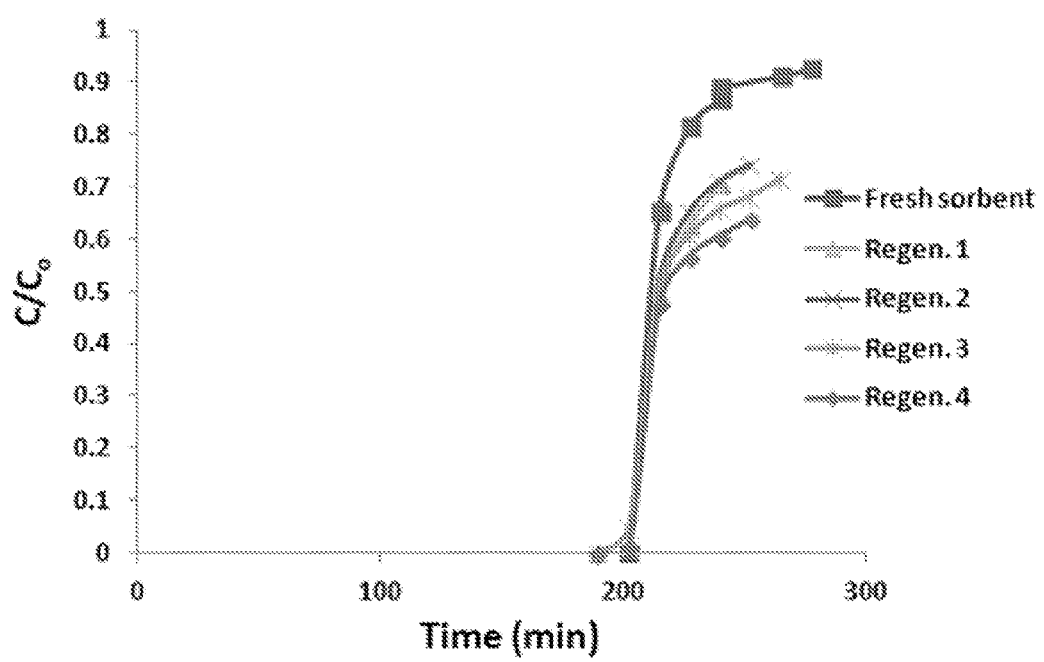
FIG. 5 shows breakthrough curves of cyclic adsorption/regeneration tests on Cu—ZnO—SBA-15.

The Cu—ZnO—SBA-15 adsorbent was exposed to a flow $H_2S$ (102 ppmv in He) at 150° C. and 1 atm in a cyclic adsorption/regeneration fashion. Regeneration was conducted at 500° C. under a flow of 5 mol % oxygen in nitrogen. FIG. 5 shows the high performance of the adsorbent towards cyclic adsorption/regeneration.

Figure 6:
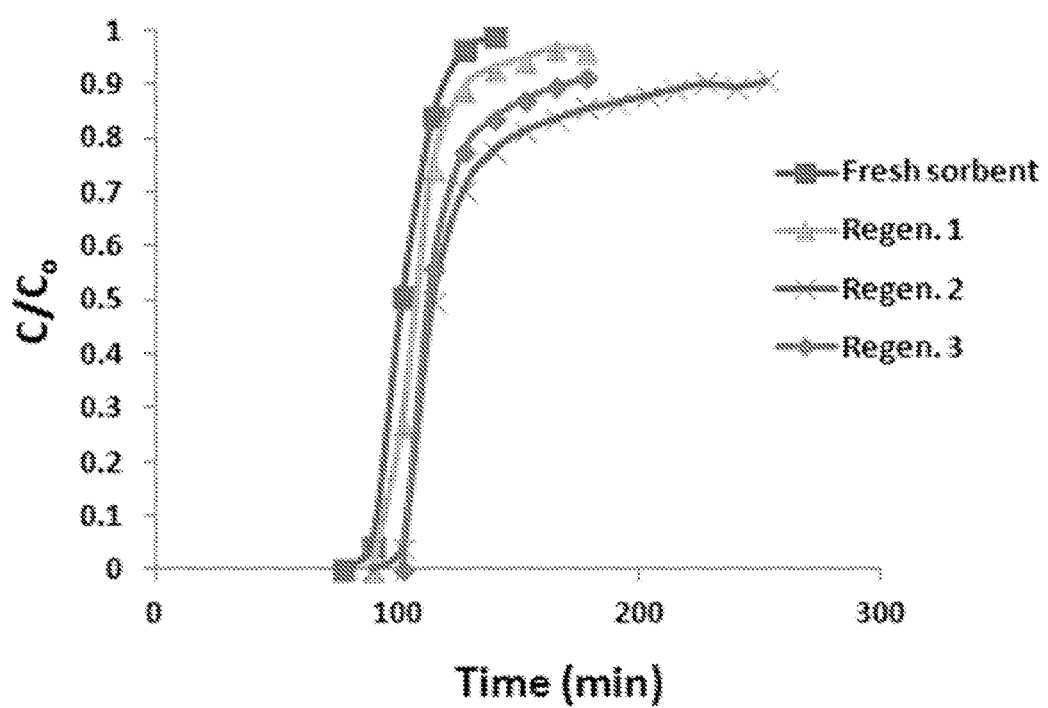
FIG. 6 shows breakthrough curves of cyclic adsorption/regeneration tests on Cu—ZnO—SBA-15.

The adsorbent showed a high level of adsorption and regenerability performances towards a simulated gas ($H_2S$ 200 ppmv, CO 300 ppmv, $C_2H_6$ 300 ppmv, $CH_4$ 0.25%, Ar 0.59%, $CO_2$ 19.88, $N_2$ 79.2) at 150° C. and 1 atm (FIG. 6). In this case, regeneration was also conducted at 500° C. under a flow of 5 mol % oxygen in nitrogen.

Example 2

Synthesis and $H_2S$ Capacity of Cu—ZnO-Silica Gel Adsorbent Material

Cu—ZnO-silica gel was synthesized using the same procedure described in Example 1 with 0.75 ml of copper-zinc nitrate (4 M) solution.

Figure 7:
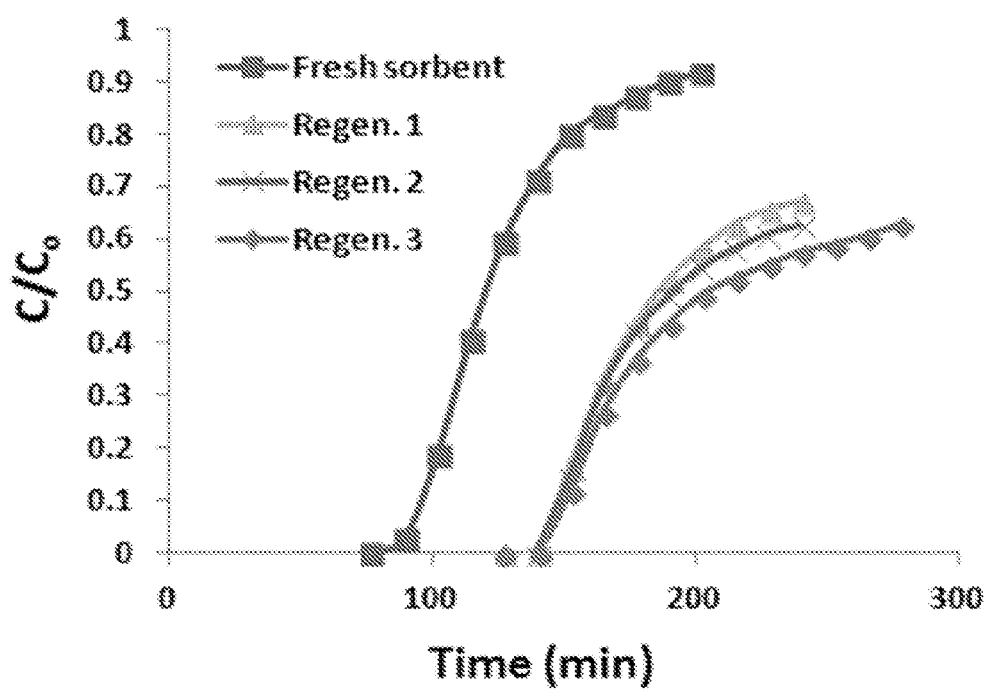
FIG. 7 shows breakthrough curves of cyclic adsorption/regeneration tests on Cu—ZnO-silica gel.

The Cu—ZnO-silica gel adsorbent material was tested using the adsorption/regeneration procedure detailed in Example 1. As shown in FIG. 7, the Cu—ZnO-silica gel adsorbent shows a high level of regenerability.

Example 3

Figure 8:
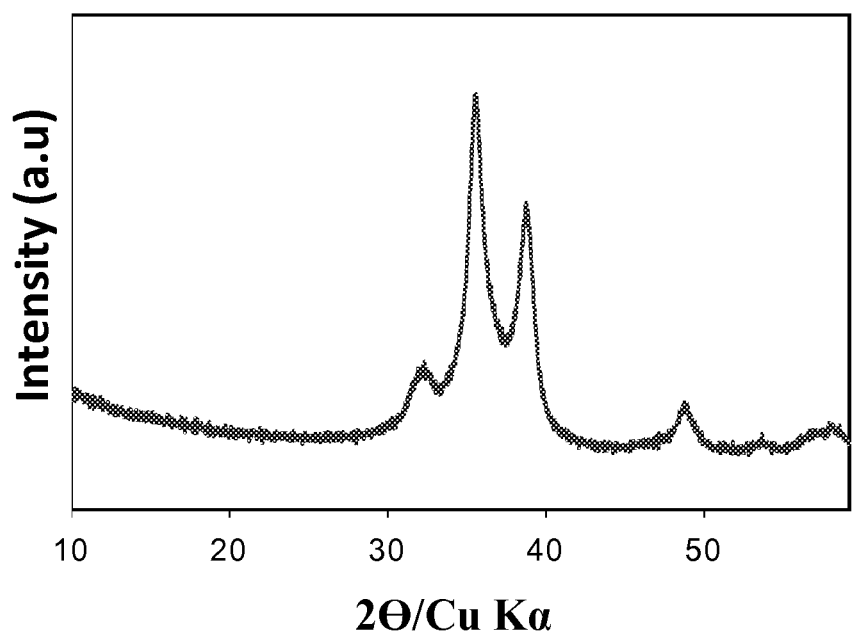
FIG. 8 XRD pattern of Cu—ZnO—$Al_2O_3$ adsorbent.

Synthesis and $H_2S$ Capacity of Cu—ZnO—$Al_2O_3$ Adsorbent Material $CuO/ZnO/Al_2O_3$ precursors, zinc acetate (1.25 M), copper nitrate (1.25 M) and aluminum nitrate (1.25 M) (molar ratio Cu:Zn:Al=6:3:1), were co-precipitated by adding $Na_2CO_3$ solution (1.25 M) at a constant pH=7 in distilled water at 70° C. The resulting solution was aged for 1 h at 80° C. The precipitate was extensively washed with distilled water to afford pH=7 and was dried at 120° C. for 12 h. The powder was calcined at 550° C. for 5 h under flowing air. FIG. 8 shows the XRD pattern of Cu—ZnO—$Al_2O_3$.

Figure 9:
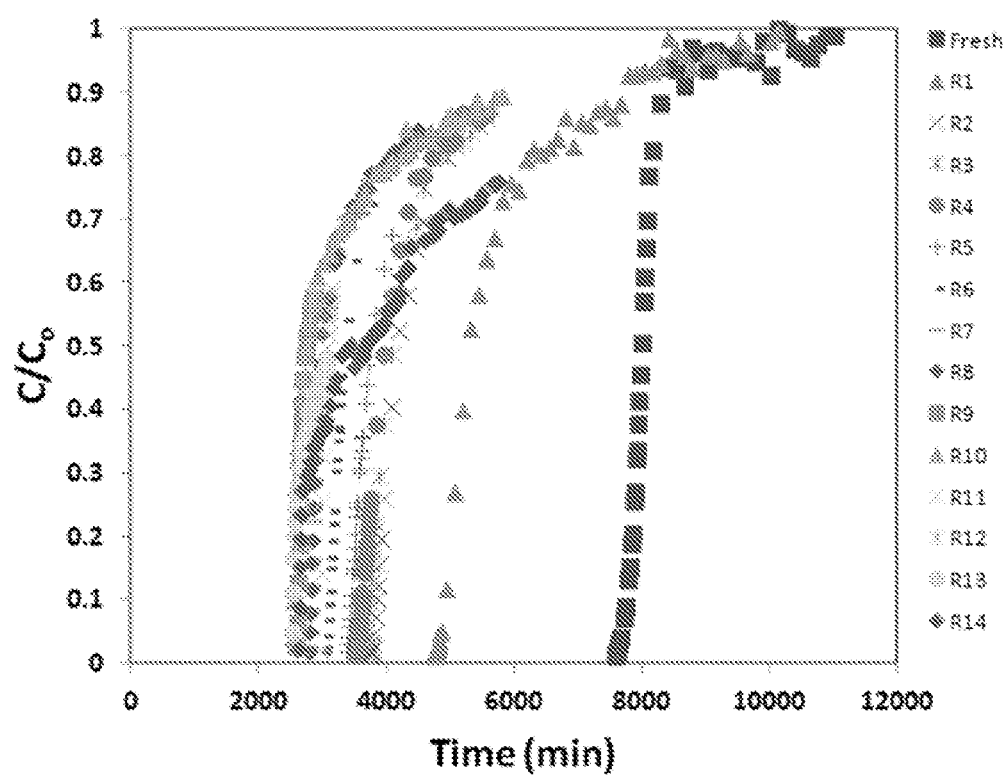
FIG. 9 shows breakthrough curves of cyclic adsorption/regeneration (14 cycles) tests on Cu—ZnO—$Al_2O_3$ adsorbent.

Exposing the Cu—ZnO—$Al_2O_3$ adsorbent to a flow of $H_2S$ (10.3 ppmv in He) at 150° C. and 1 atm in 14 adsorption/regeneration cycles revealed a loss in adsorption capacity for the first two cycles, thereafter the capacity stabilized at a high adsorption capacity of 98 $mgS/g_{sorbent}$ (FIG. 9). For this adsorbent some $SO_2$ elution was seen for a short time right before $H_2S$ breakthrough.

The invention has been described in considerable detail with reference to its preferred embodiments. However, it will be understood that numerous variations and modifications can be made without departure from the spirit and scope of the invention as set forth in the foregoing detailed disclosure and defined in the appended claims. All U.S. patents and published applications and other publications cited herein are hereby incorporated by reference in their entirety.

REFERENCES

1. Min-Hsiun Lee, U.S. Pat. No. 4,533,529, Sulfur recovery process, 1985.
2. Paul Thomas Pendergraft, Min-Hsiun Lee, E.P. Pat. No. 0260798, Improved sulfur recovery process using metal oxide absorbent, 1988.
3. Okada Osamu, Takami Susumu, Kotani Tamotu, Mori Satoshi, Fujita Hiroki, Fukumura Naoko, Ippommatsu Masamichi, E.P. Pat. No. 0324071, Process for producing a desulfurization agent, 1989.
4. Dennis R. Kidd, U.S. Pat. No. 4,725,415, Selective removal of hydrogen sulfide over zinc titanate and alumina, 1988.
5. Priyanka Dhage, Bruce Tatarchuck, Hongyun Yang, Doped supported zinc oxide sorbents for regenerable desulfurization applications, U.S. Pat. No. 7,833,316, 2010.
6. Ian A. Cody, Frederick Y. Lo, Bhupender S. Minhas, Donald E. Stratton, U.S. Patent Application Ser. No. 20100037773, Process for removing polar components from a process stream to prevent heat loss, 2010.
7. Diana Montes, Edumaris Tocuyo, Eduardo González, Douglas Rodríguez, Roger Solano, Reinaldo Atencio, Miguel A. Ramos, Alexander Moront, Reactive $H_2S$ chemisorption on mesoporous silica molecular sieve-supported CuO or ZnO, Microporous and Mesoporous Materials 168 (2013) 111-120.
8. M. Mureddu, I. Ferino, E. Rombi, M. G. Cutrufello, P. Deiana, A. Ardu, A. Musinu, G. Piccaluga, C. Cannas, ZnO/SBA-15 composites for mid-temperature removal of $H_2S$: Synthesis, performance and regeneration studies, Fuel 102 (2012) 691-700.
9. Murid Hussain, Naseem Abbas, Debora Fino, Nunzio Russo, Novel mesoporous silica supported ZnO adsorbents for the desulphurization of biogas atlow temperatures, Chemical Engineering Journal 188 (2012) 222-232
10. Hongyun Yang and Bruce Tatarchuk, Novel-doped zinc oxide sorbents for low temperature regenerable desulfurization applications, AIChE Journal 56 (2010) 2898-2904.
11. Xiaohui Wang, Tonghuaun, Ji Yang, Ling Zhao, Jinping Jia, Low-temperature $H_2S$ removal from gas streams with SBA-15 supported ZnO nanoparticles, Chemical Engineering Journal 142 (2008) 48-55.
12. Oğuz Karvan, Ahmet Sirkecioğlu, Hüsnü Atakül, Investigation of nano-C CuO/mesoporous SiO2 materials as hot gas desulphurization sorbents, Fuel Processing Technology 90 (2009) 1452-1458.
13. Mayank Behl, Junghoon Yeom, Quentin Lineberry, Prashant K. Jain and Mark A. Shannon, A regenerable oxide-based $H_2S$ adsorbent with nanofibrous morphology, Nature Nanotechnology, 7 (2012) 810-815.
14. F. M. Zhang, B. S. Liu, Y. Zhang, Y. H. Guo, Z. Y. Wan, Fazle Subhan, Highly stable and regenerable Mn-based/SBA-15 sorbents for desulfurization of hot coal gas, Journal of Hazardous Materials, 233-234 (2012) 219-227.
15. A. Sayari, B. Han, Y. Yang, Journal of the American Chemical Society, 2004, 126 (44), 14348-14349.
16. G. Prieto, J. Zecevic, H. Friedrich, K. de Jong and P. de Jongh, Nature Materials, 2013 (12) 34-39.
17. D. Jiang, L. Su, L. Ma, N. Yao, X. Xu, H. Tang and X. Li, Applied Surface Science, 2010 (256) 3216-3223.

What is claimed is:

1. A sulfidized sorbent composition comprising a porous silica support material impregnated with CuO nanoparticles, wherein the nanoparticles are essentially uniformly distributed throughout the porous silica support and sulfur compounds are adsorbed on the nanoparticles, and wherein the nanoparticles have an average diameter of about 1 to about 8 nm.
2. The sulfidized sorbent composition of claim 1, wherein the silica support material has a median pore diameter of about 5 to about 15 nm.
3. The sulfidized sorbent composition of claim 1, wherein the CuO nanoparticles further comprise Zn.
4. The sulfidized sorbent composition of claim 3, wherein the Cu/Zn molar ratio is in the range of about 20:1 to about 1:1.
5. The sulfidized sorbent composition of claim 1, wherein the porous silica support has a pore volume in the range of about 0.3 to about 3.0 ml/g.
6. The sulfidized sorbent composition of claim 1, wherein an average interparticle distance between the nanoparticles is at the theoretical maximum distance.
7. The sulfidized sorbent composition of claim 1, wherein the silica support material comprises SBA silica, MCM silica, FDU silica, KIT silica or silica gel.
8. The sulfidized sorbent composition of claim 1, wherein the sulfur compounds comprise $H_2S$.

* * * * *